United States Patent [19]

Hessman et al.

[11] Patent Number: 5,667,343

[45] Date of Patent: Sep. 16, 1997

[54] FACE MILLING CUTTER WITH RECESSES FOR ADJUSTABLE INSERT HOLDERS

[75] Inventors: Ingemar Hessman, Sandviken; Åke Almersand, Årsunda, both of Sweden

[73] Assignee: Sandvik AB, Sandviken, Sweden

[21] Appl. No.: 513,960

[22] PCT Filed: Mar. 18, 1994

[86] PCT No.: PCT/SE94/00245

§ 371 Date: Nov. 2, 1995

§ 102(e) Date: Nov. 2, 1995

[87] PCT Pub. No.: WO94/21411

PCT Pub. Date: Sep. 29, 1994

[30] Foreign Application Priority Data

Mar. 18, 1993 [SE] Sweden ................... 9300888

[51] Int. Cl.[6] .................................. B23C 5/24
[52] U.S. Cl. ................... 407/36; 407/38; 407/46
[58] Field of Search ................... 407/36, 38, 39, 407/44, 46, 88

[56] References Cited

U.S. PATENT DOCUMENTS

| | | | |
|---|---|---|---|
| 2,501,293 | 3/1950 | Sheridan | 407/38 |
| 3,847,555 | 11/1974 | Pegler et al. | 407/46 |
| 4,040,156 | 8/1977 | Tack | 407/44 |
| 4,330,227 | 5/1982 | Raye et al. | 407/46 |
| 5,102,268 | 4/1992 | Mitchell | 407/46 |

FOREIGN PATENT DOCUMENTS

| | | |
|---|---|---|
| 0 674 112 | 9/1995 | European Pat. Off. . |
| 30 42 050 | 7/1982 | Germany . |
| 33 27 478 | 2/1985 | Germany . |
| 35 30 745 | 3/1987 | Germany . |
| 189 159 | 4/1964 | Sweden . |

Primary Examiner—Daniel W. Howell
Assistant Examiner—Kenneth J. Hansen
Attorney, Agent, or Firm—Burns, Doane, Swecker & Mathis LLP

[57] ABSTRACT

A milling cutter tool for chip-breaking machining comprises a rotatable milling cutter body (1) and a plurality of cutting insert-carrying cassettes (4) which are fastened in the cutter body by screws (6,7). The screw holes of the cassette are somewhat elongate in order to enable an axial fine-adjustment of the cutting edges. This fine-adjustment is accomplished by turning an eccenter tap (8), for instance by sticking a hexagonal key through a hole in the cassette, which hole leads to the head of the eccenter tap.

9 Claims, 3 Drawing Sheets

FIG. 2
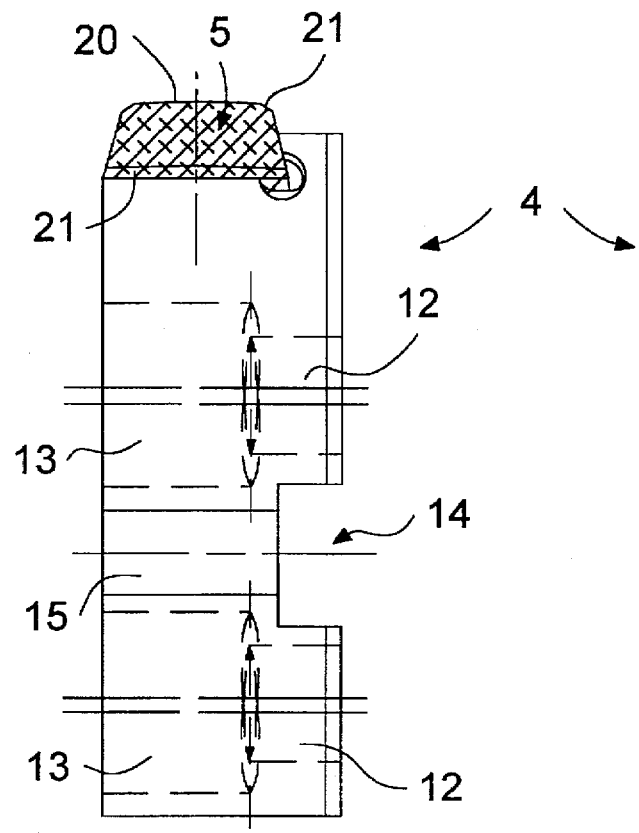
FIG. 3
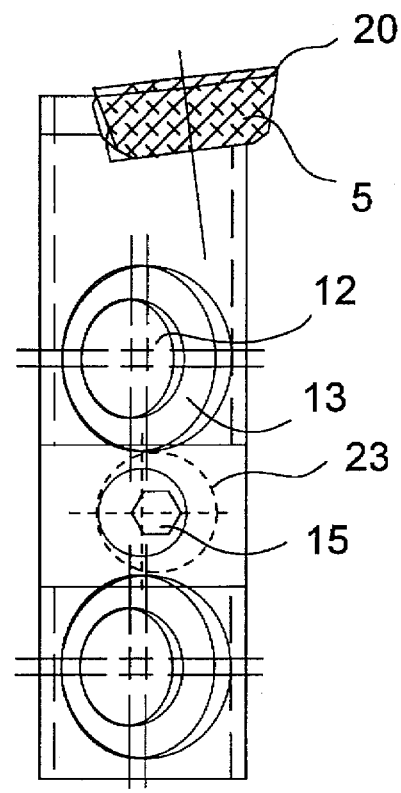
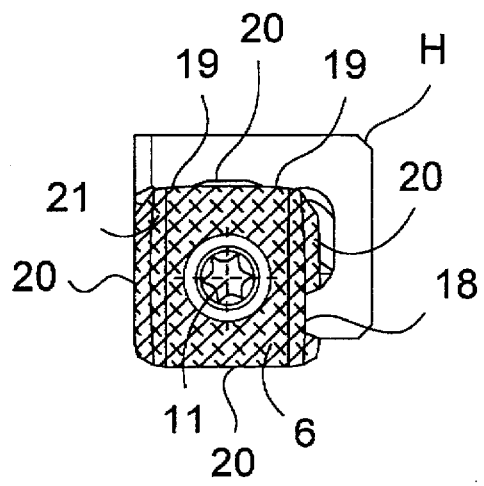
FIG. 4

FACE MILLING CUTTER WITH RECESSES FOR ADJUSTABLE INSERT HOLDERS

BACKGROUND OF THE INVENTION

The present invention relates to a milling cutter tool for chip-breaking machining and a cassette intended to be mounted onto said tool, which cassette is placed in a corresponding groove in the milling cutter tool.

In connection with milling cutters comprising mechanically fastened cutting inserts, difficulties have arisen as to the necessary precision at the positioning of the cutting inserts, in order to achieve a fine surface on the workpiece and a long life of the tool. The achievement of the required smooth surface necessitates that the cutting inserts are positioned with greatest possible exactitude, in particular in axial direction. If the axial positioning precision is insufficient, this results in an axial play, which in its turn causes an inferior surface smoothness.

In for instance, the motor industry, close pitch milling cutters are used for milling of cylinder blocks and similar parts. At those applications, very high requirements are set on the surface smoothness and $R_a$-values of maximally 1.5 µm, $R_2$-values of between 10 and 15 µm, $R_{max}$-values of 10 µm and WT-values of between 5 and 8 µm are often necessary. In order to at all achieve those surface criteria, it is necessary to position the cutting edges with very high precision, both in absolute terms and relative to the other cutting edges of the milling cutter body. Thus, the axial height difference between two cutting edges may not exceed a few µm. Generally, all cutting edges should lie within an axial tolerance range of 4 µm, and preferrably even less. This has turned out to be practically unattainable for cutting inserts with relatively thick coatings, whose coating thicknesses can vary up to 20 µm. Hence, these differences in the thicknesses of the individual cutting inserts make necessary to attain a very accurate axial positioning of each separate cutting element. Moreover, it is of course necessary that the cutting edges maintain their exact axial positions and do not move dug to the axial forces caused by the contact with the workpiece. Of course, it is also important to obtain a precise radial and tangential positioning of the cutting edge and which positioning also maintain their exactitude, also after a long time of use.

A number of constructions for the precise axial positioning of the cutting inserts and their cutting edges are known per se. However, all of them are marred by one or several disadvantages, such as complicated constructions with many separate parts, or an unsatisfactory axial positioning accuracy. A description of some of these known solutions is now presented underneath.

SE-C-189 159 discloses a milling cutter comprising axially adjustable cassettes which can be positioned by two wedges. The axial positioning is done by pressing the cassette by hand, for instance with the thumb, to the desired position, whereafter it is fixed with the wedges. As can be easily appreciated, no high accuracy is attained. Further, this fixation mechanism comprises at least four separate parts, which complicates the handling.

DE-A-3 530 745 shows a cassette that can be axially positioned in a milling cutter by a differential screw 5. However, also this construction suffers from insufficient axial position accuracy and, moreover, the manufacturing of the cutter body is rendered more difficult by the fact that the cassette recesses do not extend through the whole width of said cutter body. Furthermore, the accessability of the differential screw 5 is obstructed because its head faces axially rearwards and not towards the open and easily accessible envelope surface of the cutter body.

DE-A-3 327 478 also has the inconvenience of the cassette recesses not being through-going. Further, the axial positioning accuracy is not satisfactory because the head of adjustment screw 26 has a too long free extension, which causes an elastic deformation of the screw and a deteriorated position precision of the cutting edge.

SUMMARY AND OBJECTS

Thus, a primary object of the present invention is to create a multi-toothed milling cutter that enables a very precise axial positioning of the cutting edges.

Another object of the present invention is to create a multi-toothed milling cutter comprising as few separate parts as possible.

A further object of the present invention is to obtain an absolutely play-free fastening of the insert-carrying cassettes in the cassette grooves, both radially, axially and tangentially.

These and other objects have been achieved in a surprisingly simple way by constructing a milling tool comprising the features as defined in the characterizing part of claim 1.

BRIEF DESCRIPTION OF THE DRAWINGS

For illustrative but non-limiting purposes, a preferred embodiment of the invention will now be further described with reference to the appending drawings in which:

FIG. 2 shows a side-view of a cassette according to the invention.

FIG. 3 shows a front view of a cassette according to the invention.

FIG. 4 shows a top view of a cassette according to the invention.

DETAILED DESCRIPTION OF THE PREFERRED EMBODIMENTS

Figure 1:
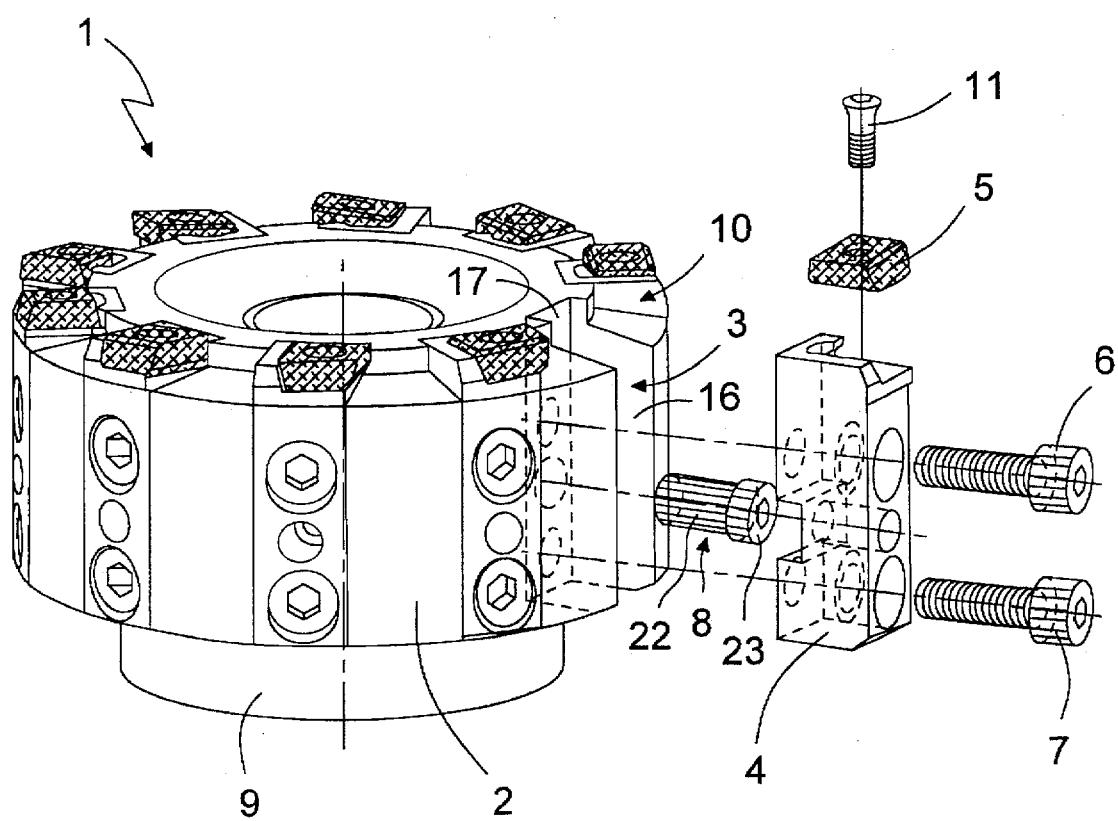
FIG. 1 shows a perspective view of the milling cutter according to the invention, one cassette being shown in an exploded view.

In FIG. 1 a milling cutter of basic cylindrical form is generally designated by 1. Its diameter can generally vary between 50 and 700 mm, suitably between 70 and 500 mm and in particular between 80 and 400 mm. On the underside of the cutter body there is an integrated, cylindrical holding part 9 for connecting the cutter body with a rotating driving means. The cutter body is provided with recesses or grooves 3 for carrying the cassettes 4. Between two adjacent cassettes chip spaces 10 are formed on the upper side of the cutter body. For manufacturing reasons, the cassette grooves 3 are preferrably through, from the top side to the bottom side of the cutter, although they need not. If the grooves are through, they can relatively easily be reamed or milled. The back surface 17 of a groove or recess 3 is substantially perpendicular to the two side surfaces 16. The back surface 17 constitutes an abutment surface for a cassette 4 at the same time as the side surfaces 16 function as support surfaces for the same cassette. The number of grooves in the cutter body varies depending upon the diameter of the body and upon the desired pitch. The illustrated embodiment relates to a milling cutter with an outer diameter of 103 mm and ten grooves. Naturally, not all grooves have to be provided with a cassette. Thus, sometimes an asymmetrical apportionment may be desirable in order to avoid vibrations.

The cassettes are fixed in the grooves 3 by one to four, preferably two, fastening screws 6 and 7. Each fastening screw can be provided with a hexagonal hole in its head in order to tighten them with a correspondingly formed key. Each cassette is provided with through holes 12 for inserting the fastening screws 6 and 7. Further, each hole 12 comprises a part 13 with a larger diameter than the rest of the hole. The hole parts 13 are intended to accommodate the heads of the screws.

Figure 5:
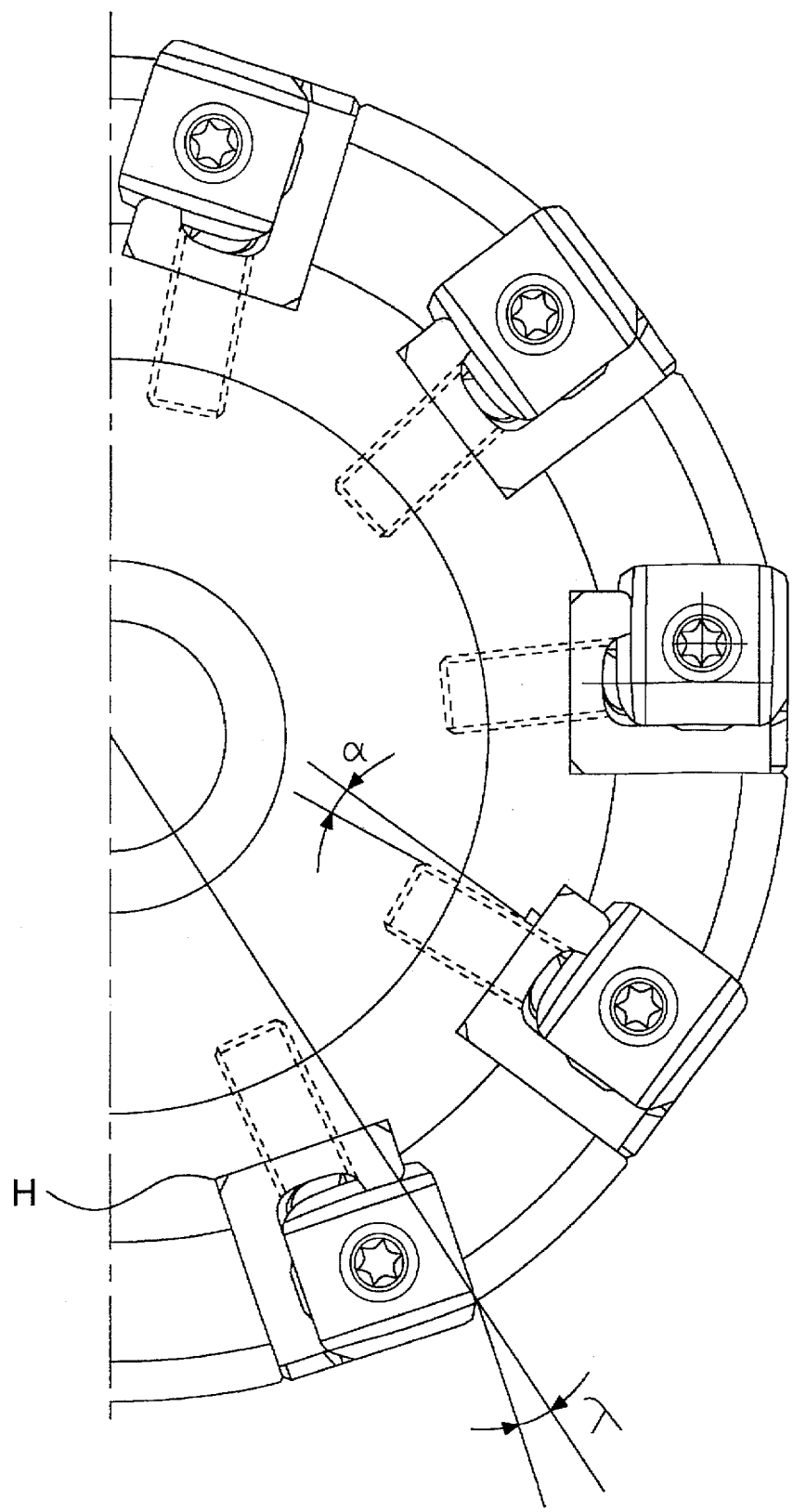
FIG. 5 shows half a milling cutter straight from above.

As is best seen in FIG. 5, the cutting edges according to the illustrated embodiment have negative radial angles $\lambda$. These can be between <0° and −20°, suitably between −3° and −17° and preferably between −7° and −13°, all of them being preferably equally large. The negative radial angle of the cutting edge is suitably obtained by making the cassette grooves 3 with a certain radial inclination, the edge sides of the cutting insert 5 being substantially parallel to the edge sides of the cassette 4.

The stability of the fastening of the cassettes in the milling cutter body is influenced very positively by the fact that fastening screws 6,7 are angled radially in relation to the radial extension of the cassette and the cassette groove. In FIG. 5, this angle is designated $\alpha$. It may also be expressed as the angle between the normal of bottom surface 17 and the axial direction of the fastening screw. By this angling, the cassette is pressed in a direction against corner H. In a corresponding way, holes 12,13 in the cassette are bored with the same angle in relation to the side surfaces of the cassette. Angle $\alpha$ is between 1° and 13°, suitably between 2+ and 10° and preferably between 4° and 8°.

In order to as far as possible give the cassette, and thereby the cutting edge, a well defined position, the cassette has been formed with an angle that somewhat exceeds a right angle at corner H. Moreover, according to the figures this corner is provided with a corner chamfer. However, in the corresponding corner cassette groove 3 is formed with a substantially right angle. Since the back of the cassette is brought to abut against the bottom side 17 of the groove, a thin wedge-like gap will be formed between the cassette groove and the cassette, the widest part of the wedge being situated at corner H and tapering for finally disappearing in a direction radially outwards. A line abutment is obtained at the envelope surface of the milling cutter, along the radially outer edge of the cassette and at the same time its rear edge, seen in the direction of rotation, and the rear (in the direction of rotation) side surface 16 of the cassette groove. In this way a statically determined and well defined positioning of the cassette is attained: by the fastening with screws 6,7 it is in contact with on the one hand the bottom surface 17 of groove 3 with its abutment surfaces above and underneath the recess for the head 23 of the eccentric tap, and on the other hand at the area of the envelope surface of the milling cutter by a line abutment. Of course, the "line" abutment has a certain width but it may be considered as substantially line-formed. Normally, the width of the line abutment does not exceed ½ mm. The corner angle of the cassette at corner H is between >90° (for instance 90.05°) and 92.5°, suitably between 90.1° and 91.5° and preferably between 90.1° and 90.5°. If the cassette corner is fully perpendicular, as in the prior art, then a gap and statical indefinition may easily arise.

The hole parts 12 and 13 are not perfectly circular but have a somewhat larger extension in the axial direction of the cassette than in a direction perpendicular to that direction. The purpose of this hole elongation is of course to make possible an axial movement of the cassette, which can be accomplished by turning the eccentric tap 8. This tap consists of a smooth cylindrical part 22 and a head 23 which is eccentrically positioned to the part 22. When mounted, the eccentric head 23 is situated in an elongated recess or in a through groove 14 on the back of the cassette. The width of this groove corresponds substantially to the diameter of the eccentric head 23. Further, the cassette is provided with a through hole 15, which ends in the groove 14 just opposite to the eccentric head 23. In order to avoid that the eccentric tap falls out through hole 15, the latter has a smaller diameter than the eccentric head. In this way, the eccentric tap is efficiently and safely kept in the corresponding orifice in the cutter body, at the same time as it is easily accessible by sticking a hexagonal key into the hole 15.

The axial positioning of the cassette is performed by first loosening the fastening screws 6 and 7 and then turning the eccentric tap 8 until the desired axial height of the cutting edge has been reached. This height is measured by a "thousandth-gauge". Depending on the eccentricity of the eccentric head 23, the cassette can be displaced from in principle 0 to 5 mm, suitably from 0.05 to 3 mm and in particular from 0.05 to 1 mm. When the predetermined axial height has been reached, the fastening screws 6 and 7 are tightened again. In this simple manner, the cutting edges can be axially adjusted within a range of down to 2 µm. This makes it possible to achieve very smooth surfaces. Thus, at a cutting depth of about 0.5 mm and a feed per tooth of between 0.05 and 0.25 mm, a $R_a$-value of 0.6 µm was achieved. Otherwise, this low $R_a$-value is only attainable by grinding.

On the top side of the cassette a cutting insert pocket is foreseen for the accommodation of a cutting insert 5 which can be fixed by a screw 11. Preferably, the pocket is arranged with three abutment surfaces 18, 19, 19 in order to provide a statically well defined position of the cutting insert. Preferably, the cutting inserts are mounted axially, as may be seen in the figures. This improves the accessibility at the mounting since the heads of the screws 11 face the free upper surface of the milling cutter body.

The geometry of the cutting insert is not a critical feature of the present invention. However, in order to decrease the cutting forces the rake angle should be positive and a sufficient clearance should be guaranteed. Sufficient clearance is normally effected by inclining the bottom surface of the insert pocket towards a radial plane through the cutting miller. According to FIG. 3 a clearance angle of between 5° and 15°, preferrably 7°, has been attained in this way, despite the fact that that the upper and lower sides as such of the cutting insert are plane and parallel, and a rake angle of between 5° and 20°, preferrably about 8°.

Thus, in accordance with the above, although negative rake angles are also feasible, positive cutting geometries are preferred. This brings about several advantages, such as a minimization of edge damages, low cutting forces and a low heat generation, and the capability of machining thin-walled workpieces. Another advantageous effect is that the fixtures do not have to be over-dimensioned, which renders the machine equipment less costly for the buyer.

The radial angle of the cutting edge can vary from positive to negative but is preferrably negative. Thus, the chips are conveyed more easily at negative radial angles because the chips are then flung outwards. At positive radial angles the chips may be pushed inwards and this may cause chip accumulation and disturbances of the cutting process, with possible damages of the surface of the workpiece.

According to the drawings, the cutting insert 5 is a double-sided indexable cutting insert with two cutting edges 20 on each side. The two cutting edges on the same side are situated along two opposite edges. The two cutting edges on the one side are displaced by 90° in relation to the two cutting edges on the other side, so that the insert has to be rotated a quarter of a revolution when it is turned, in order to indexate a new cutting edge into its operative position. The insert according to the illustrated embodiment has also been provided with corner faces 21. An important advantage of this cutting insert is that it comprises four operative cutting edges, which improves the cutting economy quite considerably.

Since each individual operative cutting edge may be axially positioned with great precision, the present invention is well adapted for using cutting inserts with different thicknesses. Thus, inserts with thick coatings and/or PVD-coatings (PVD=Physical Vapour Deposition), where the thicknesses may differ by 20–30 μm, are well suited for the present invention. Also reground inserts, inserts coated with diamond and inserts comprising a piece of cubic boron nitride are well suited for the present invention.

In view of the above, the present invention attains a very precise axial positioning of the cutting edges with a minimum of separate construction elements. If one disregards the necessary screws and the cutting insert, which are also present in all known constructions, only one single element is required, viz. the cassette per se. In spite of this simplification, a surface smoothness corresponding to a $R_a$-value of 0.6 μm was attained, with good repeatability, and occasionally a value as low as 0.3 μm was achieved.

A further advantage of the present invention is that the axial positioning of the cutting edges does not in any way influence their radial positioning. This has the advantageous effect that all cutting edges around the cutter body will work equally effectively and cut equally thick chips, this enabling a uniform wear and an optimal life.

We claim:

1. Milling cutter tool for chip-breaking machining comprising:
    a milling cutter body which is rotatable in a direction of rotation and includes a plurality of grooves at a periphery of the milling cutter body;
    a plurality of cutting insert-carrying cassettes, each cassette received in one of the plurality of grooves at the periphery of the milling cutter body and being fastened in the groove by two fastening screws, and each of the two fastening screws received in a through-hole in the cassette, which through-holes are elongate in a longitudinal direction of the cassette in order to make possible a certain axial displacement of the cassette in the groove;
    a recess arranged between the two fastening screws on a side of the cassette that faces towards an axis of rotation of the milling cutter tool, which recess is substantially perpendicular to the axis of rotation of the milling cutter tool;
    an eccentric tap is arranged with a head in said recess;
    a further through-hole is arranged in the cassette, the further through-hole opening into said recess, facing the head of the eccentric tap, and each fastening screw is radially angled so that the cassette is pressed against a radially inner, trailing corner of the cassette groove in a direction of rotation.

2. Milling cutter tool according to claim 1, wherein the cassette grooves are substantially axial and extend through the milling cutter body, from an upper to a lower side of the milling cutter body.

3. Milling cutter tool according to claim 1, wherein the further throughhole which leads to the recess in the cassette has a smaller diameter than the head of the eccentric tap, thus preventing the eccentric tap from falling out.

4. Milling cutter tool according to claim 1, wherein each cassette on an upper-side carries a detachable cutting insert which has a positive rake angle in relation to the workpiece.

5. Milling cutter tool according to claim 1, wherein each through-hole in the cassette for accommodating one of said fastening screws comprises a part with a larger diameter, in order to countersink the head of the fastening screw, and in that each through-hole is radially angled.

6. Milling cutter tool according to claim 1, wherein a radially inner, trailing corner of each cassette in the direction of rotation, has an angle between 90.05° and 92.5°.

7. A milling cutter tool comprising:
    a milling cutter body having an axis of rotation and a plurality of grooves extending substantially parallel to the axis of rotation;
    a plurality of cutting insert carrying cassettes accommodated in the plurality of grooves in the milling cutter body each cassette having a recess;
    a plurality of fastening screws for fastening the cassettes in the grooves in the milling cutter body;
    a plurality of eccentric taps each having an eccentrically mounted head positioned in the recess in one of the cassettes so that rotation of the tap adjusts the position of the cassette along a longitudinal axis of the cassette which is substantially parallel to the axis of rotation of the cutter body;
    wherein each of the cassettes includes a bore extending from an outer surface of the cassette to the recess, the bore having a diameter smaller than a diameter of the head of the eccentric tap.

8. The milling tool according to claim 7, wherein the cassettes include through-holes for receiving the fastening screws, the through-holes being elongated along the longitudinal axis of the cassette to accommodate longitudinal displacement of the cassette.

9. The milling cutter tool according to claim 7, wherein each of the fastening screws are radially angled with respect to the milling cutter body so that the cassettes are pressed against radially inner surfaces of the grooves in the milling cutter body and against the surfaces of the grooves in the direction of rotation.

* * * * *